United States Patent [19]

Hisaki et al.

[11] Patent Number: 5,286,783
[45] Date of Patent: Feb. 15, 1994

[54] COPOLYMER LATEX

[75] Inventors: Hiroshi Hisaki, Yokosuka; Katsuo Hagiwara, Yokohama; Yasuhiro Nakano, Tokyo; Satoru Takinami, Yokohama; Masayoshi Sekiya, Tokyo, all of Japan

[73] Assignee: Nippon Zeon Co., Ltd., Tokyo, Japan

[21] Appl. No.: 921,397

[22] Filed: Jul. 30, 1992

Related U.S. Application Data

[60] Continuation of Ser. No. 627,242, Dec. 14, 1990, abandoned, which is a division of Ser. No. 432,307, Nov. 3, 1989, abandoned, which is a continuation of Ser. No. 909,250, Sep. 19, 1986, abandoned.

[30] Foreign Application Priority Data

Sep. 24, 1985 [JP]  Japan ................... 60-210656

[51] Int. Cl.$^5$ ................................. C08K 3/20
[52] U.S. Cl. ................... 524/510; 524/808; 526/265
[58] Field of Search ............... 524/808, 510; 526/265

[56] References Cited

U.S. PATENT DOCUMENTS 4,439,556  3/1984  Girgis ................... 524/510

OTHER PUBLICATIONS

CA 78(6):31151q.
CA 67, 22200, p. 2205 (1967).
Chemical Abstracts CA105(6):44325a.

*Primary Examiner*—Bernard Lipman
*Assistant Examiner*—Peter D. Mulcahy
*Attorney, Agent, or Firm*—Sherman and Shalloway

[57] ABSTRACT

A copolymer latex obtained by emulsion-polymerization of 45 to 85% by weight of a conjugated diene monomer, 0.1 to 25% by weight of an ethylenically unsaturated acid monomer, 10 to 45% by weight of a vinylpyridine monomer and 0 to 30% by weight of another monomer copolymerizable with these monomers. The surface of the latex particles contains the carboxy groups in an amount of at least 0.01 milliequivalent per gram of the copolymer. An adhesive composition comprising the copolymer latex is useful for boding fibers, particularly polyester fibers, to rubber with a high adhesion strength.

1 Claim, No Drawings

COPOLYMER LATEX

This application is a continuation of application Ser. No. 07/627,242, filed Dec. 14, 1990 now abandoned, which is a division of application Ser. No. 07/432,307, filed Nov. 3, 1989, now abandoned, which is a continuation of Ser. No. 06/909,250, filed Sep. 19, 1986, now abandoned.

This invention relates to a latex comprising copolymer of a conjugated diene, an ethylenically unsaturated acid and vinylpyridine which is useful as an adhesive for rubber and fibers, and to a process for its production.

In order to bond reinforcing fibers such as polyamide or polyester fibers to rubber, it has been the usual practice to dip the fibers in an aqueous dispersion comprising a resorcinol-formaldehyde resin and a latex prior to bonding. Generally, the latex used is, for example, a latex of a copolymer of butadiene, vinylpyridine and styrene, or a mixture of it with a styrene/butadiene copolymer latex or a natural rubber latex.

Polyester fibers have been extensively used as rubber reinforcing fibers in automobile tires, belts, hoses, etc. because of their low elongation. The reinforcing fibers, however, find only limited applications because under certain service conditions, they undergo considerable degradation. When such polyester fibers are used in rubber products containing vulcanization accelerators of the thiuram, sulfenamide or guanidine type, an amine-type antioxidant or natural rubber, they tend to undergo degradation. For example, the polyester fibers are degraded and markedly reduced in their reinforcing ability in a long vulcanization step in the manufacture of automobile tires or during high-speed running of automobile tires. Attempts have been made to remove this defect by, for example, (1) selecting suitable vulcanization accelerators and antioxidants (i.e., improvement of rubber compounding recipes), (2) reducing the terminal carboxyl group content of the polyester fibers (improvement of the polyester fibers themselves), or (3) coating the polyester fibers with a carboxyl-containing water-soluble polymer such as poly(meth)acrylic acid or an acrylic acid/methyl methacrylate copolymer as disclosed in Japanese Laid-Open Patent Publication No. 166235/1980. According to the method (1), the compounding of rubber is restricted, and the desired vulcanized rubber properties cannot be obtained. Furthermore, the adhesion strength between rubber and the fibers after long vulcanization at high temperatures (to be referred to as adhesion strength after over-cure) is not fully improved. According to the method (2) or (3), the thermal degradation of the fibers themselves can be reduced, but it is impossible to improve the adhesion strength after over-cure.

It is an object of this invention to provide a copolymer latex which can improve the adhesion strength after over-cure between reinforcing polyester fibers and rubber in such rubber products as tires, belts and hoses, and can also be used for fibers other than the polyester fibers in the same way as a conventional vinylpyridine-type latex adhesive.

The present inventors have made extensive investigations on the basis of the above information in order to develop an improved copolymer latex for bonding fibers to rubber.

Thus, according to this invention, there is provided a copolymer latex obtained by emulsion-polymerization of 45 to 85% by weight of a conjugated diene monomer, 0.1 to 25% by weight of an ethylenically unsaturated acid monomer, 10 to 45% by weight of a vinylpyridine monomer and 0 to 30% by weight of another monomer copolymerizable with these monomers, the amount of the carboxyl groups on the surface of the latex particles being at least 0.01 milliequivalent per gram of the copolymer.)

The copolymer latex of this invention is characterized in that each of the latex particles has a carboxyl group and a pyridyl group.

The conjugated diene monomer used in this invention may be at least one aliphatic conjugated diene monomer having 4 to 9 carbon atoms such as 1,3-butadiene, 2-methyl-1,3-butadiene, 2,3-dimethyl-1,3-butadiene and halogen-substituted butadienes (e.g., chloroprene). The amount of the conjugated diene monomer based on the total required weight of the monomers is 45 to 85% by weight, preferably 60 to 75% by weight. If its amount falls outside the specified range, the adhesion strength is reduced.

Examples of the ethylenically unsaturated acid monomer used in this invention include monoethylenically unsaturated carboxylic acids such as acrylic acid, methacrylic acid, crotonic acid, cinnamic acid, itaconic acid, fumaric acid, maleic acid and butenetricarboxylic acid; monoalkyl esters of monoethylenically unsaturated dicarboxylic acids such as monoethyl itaconate, monobutyl fumarate and monobutyl maleate; and monoethylenically unsaturated sulfonic acids or alkali salts thereof, such as sodium sulfoethylacrylate, sodium sulfopropylmethacrylate and acrylamideopanesulfonic acid. These monomers may be used singly or in combination. These ethylenically unsaturated acid monomers may be used in the form of a hydrolyzable salt or acid anhydride.

The amount of the ethylenically unsaturated acid monomer based on the total required amount of the monomers is 0.1 to 25% by weight. If it is less than 0.1% by weight, there is only a small effect of improving the adhesion strength after over-cure between polyester fibers and rubber. If it exceeds 25% by weight, the adhesion strength does not increase further, but rather tends to decrease. It is preferably 0.2 to 12% by weight, more preferably 0.5 to 8% by weight.

The vinylpyridine monomer is desirably 2-vinylpyridine, but there can also be used its isomers such as 3-vinylpyridine and 4-vinylpyridine, and alkylvinylpyridines such as 2-methyl-5-vinylpyridine and 5-ethyl-2vinylpyridine. The amount of the vinylpyridine monomer used is 10 to 45% by weight, preferably 15 to 40% by weight, based on the total required amount of the monomers. If it falls outside this range, the adhesion strength is lowered.

Examples of the other monomer which is copolymerizable with the above monomers and may be used as desired include aromatic vinyl compounds such as styrene, alpha-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene, and aliphatic vinyl compounds such as ethylene, propylene, acrylonitrile and vinyl chloride. They may be used either singly or in combination. The amount of the other monomer is not more than 30% by weight based on the total required weight of the monomers.

The copolymer latex of this invention is characterized by the fact that the amount of the carboxyl groups present on the surface of the copolymer latex particles obtained by emulsion-polymerization of the aforesaid monomers is at least 0.01 milliequivalent per gram of the copolymer. If it is less than 0.01 milliequivalent, the adhesion strength after over-cure between the polyester fibers and rubber is not improved. It is preferably at least 0.02 milliequivalent, more preferably at least 0.05 milliequivalent. When it becomes at least 2.5 milliequivalents, the effect of improving the adhesion strength remains unchanged, but the resulting latex is thickened and is difficult to use. The carboxyl group content on the surface of the latex particles, as used in this invention, is measured by the method described hereinbelow in Example 1.

A two-step polymerization method described below is especially suitable for the production of the copolymer latex of this invention characterized by the presence of carboxyl groups on the surface of the latex particles.

In carrying out the two-step polymerization, 2.5 to 60% by weight, based on the total required weight of the monomers, of a monomeric mixture is emulsion-polymerized in a first step. The monomeric mixture should contain at least 3, preferably at least 5, more preferably at least 10, % by weight of the conjugated diene monomer based on its total required amount and at least 80% by weight of the ethylenically unsaturated acid monomer based on its total required amount. If the monomeric mixture contains the ethylenically unsaturated acid monomer only in an amount smaller than 80% by weight based on its total required amount, it is difficult to inhibit the formation of a coagulum during polymerization. The monomeric mixture preferably contains at least 90% by weight, based on its total required amount, of the ethylenically unsaturated acid monomer, more preferably all the required amount of it. The vinylpyridine monomer is desirably not used in the first step polymerization in order to inhibit formation of a coagulum during polymerization, but it may be used in an amount of not more than 50% of its total required amount.

If the amount of the monomeric mixture used in the first-step polymerization is less than 2.5% by weight of the total required amount of the monomers, the polymerization time becomes long. If it exceeds 60% by weight, the adhesion characteristics of the finally obtained latex are degraded. Preferably, the amount of the monomeric mixture in the first step is 5 to 50% by weight.

Desirably, the conversion of the monomers to polymer in the first step is desirably at least 60%. If it is less than 60%, the finally obtained latex has degraded adhesion characteristics. Preferably, it is at least 80%.

In a second step, the remainder of the monomers are added to the polymerization system, and the emulsion polymerization of the mixture is continued.

There is no particular restriction on the mode of emulsion polymerization either in the first step or in the second step. The emulsion polymerization may be batchwise, semi-batchwise or continuous. The polymerization temperature may be low or high. Emulsifiers, polymerization initiators and molecular weight controlling agents used in ordinary emulsion polymerization may be used in the present invention without any restriction.

Examples of emulsifiers that can be used in the invention may include nonionic surfactants such as alkyl esters, alkylphenyl ethers and alkyl ethers of polyethylene glycol; anionic surfactants such as sulfate esters of higher alcohols, alkylbenzenesulfonic acid salts and aliphatic sulfonic acid salts; and amphoteric surfactants such as betaines.

Examples of polymerization initiators that can be used include water-soluble initiators such as potassium persulfate and ammonium persulfate, redox initiators, and oil-soluble initiators such as benzoyl peroxide.

Examples of the molecular weight controlling agents include mercaptans, xanthogen disulfides and halogenated hydrocarbons.

The resulting copolymer latex of this invention is stable in spite of the fact that the carboxyl group and the pyridyl group which react with each other are present on the surface of, and within, the latex particles.

When the copolymer latex of this invention is used as an adhesive for bonding fibers, particularly polyester fibers, to rubber, a marked improvement in adhesion strength after over-cure can be achieved over the use of conventional polymer latices.

As an adhesive composition for bonding between fibers and rubber, the copolymer latex of this invention is used as a mixture with a resorcinol-formaldehyde resin as in the case of using conventional vinylpyridine-type polymer latices.

The resorcinol-formaldehyde resin may be any of those used heretofore in the field of adhesives, for example that disclosed in U.S. Pat. No. 4,251,409.

To increase adhesion strength, it may also be used in combination with a 2,6-bis(2,4-dibydroxyphenylmethyl)-4-chlorophenol composition, a polyepoxide compound, and/or a blocked polyisocyanate compound.

The adhesive composition in accordance with this invention comprising the copolymer latex as a base is usually)a mixture of 100 parts by weight of the copolymer latex as solids and 10 to 40 parts by weight (dry weight) of the resorcinol-formaldehyde resin. In this adhesive composition, part of the copolymer latex may be replaced by at least one of a styrene/butadiene copolymer rubber latex, a modification product thereof, an acrylonitrile/butadiene copolymer rubber latex, a modification product thereof, and natural rubber latices.

There is no particular restriction on the method of using the adhesive composition, and it may be applied in the same way as a known adhesive composed of a resorcinol/formaldehyde resin and a vinylpyridine-type polymer latex. Usually, an aqueous dispersion having a concentration of 10 to 30% by weight is prepared from the adhesive composition. Fibers in the desired form are dipped in the aqueous dispersion, dried and heat-treated. Then, the fibers are molded together with an unvulcanized rubber compound, and the molded product is cured whereby the fibers can be bonded to rubber. It is also possible to use fibers of the desired form on which the adhesive composition has been coated in advance.

The adhesive composition of this invention may be applied to all kinds of fibers such as rayon fibers, polyester fibers, polyamide fibers and aramide fibers. These fibers may be in the form of a woven fabric, a cord, a yarn, etc.

When used in bonding polyester fibers to rubber, the adhesive composition of this invention greatly improves the adhesion strength after over-cure as compared with conventional adhesive formulations. It can also be used for other fibers as is the case with conventional vinylpyridine-type polymer latices.

The following examples illustrate the present invention more specifically. All parts and percentages in the following examples are by dry weight.

EXAMPLE 1

In each run, an autoclave equipped with a stirrer was charged with 150 parts of water, 0.1 part of tetrasodium ethylenediaminetetraacetate, 5 parts of sodium laurylsulfate, 0.5 part of sodium bicarbonate, 0.5 part of t-dodecylmercaptan, 0.3 part of potassium persulfate and 100 parts of monomers I in the ratios indicated in Table 1. With rotational mixing, the monomers were reacted at 60° C. for 15 hours to prepare a seed latex.

Then, an autoclave equipped with a stirrer was charged with 40 parts of the seed latex as solids, and further with 60 parts of monomers II indicated in Table 1, 0.1 part of tetrasodium ethylenediaminetetraacetate, 2 parts of sodium laurylsulfate, 0.5 part of t-dodecylmercaptan, 0.3 part of potassium persulfate, and a supplementary amount of water to adjust the total amount of water to 150 parts. With rotational mixing, the monomers were reacted at 60° C. When the polymerization conversion reached 95%, 0.05 part of hydroquinone was added to stop the reaction. The unreacted monomers were removed under reduced pressure. Thus, copolymer latices A and B were obtained.

The carboxyl group content and the pyridyl group content on the surface of the latex particles were determined by the following procedure based on the Kawaguchi method (J. Appl. Poly. Sci., vol. 26, 2015–2022, 1981).

The latex was put in a cellulose tube, and the tube was immersed in flowing water for one week to remove soluble substances from the latex by dialysis. Polyoxyethylene lauryl ether was added in an amount 1/10 of the amount of the latex as solids. The sample was precisely weighed to an amount corresponding to 2 g of solids, and 3 g of 0.5N hydrochloric acid was added. The mixture was stirred by a magnetic stirrer. After the lapse of 15 minutes, the mixture was titrated with a 0.1N aqueous solution of sodium hydroxide. A curve of electrical conductivity was drawn, and from the data at a flex point, the carboxyl group content and the pyridyl group content on the surface of the latex particles were determined.

The particle diameter of the latex was measured by a laser light sourse scattering method (model 4600 of Malvern Company, Britain).

The properties of each of the latices are shown in Table 1.

TABLE 1

| Latex | Comparison A | Invention B |
|---|---|---|
| Monomers I | | |
| Butadiene | 30 | 30 |
| Styrene | 10 | 9 |
| Methacrylic acid | — | 1 |
| Total (parts) | 40 | 40 |
| Polymerization conversion (%) | 96 | 95 |
| Monomers II | | |
| Butadiene | 40 | 40 |
| Styrene | 5 | 5 |
| Vinylpyridine | 15 | 15 |
| Total (parts) | 60 | 60 |
| Average particle diameter of the latex (Å) | 1300 | 1310 |
| Carboxyl group content on the surface of the latex particles (milliequivalents/g of copolymer) | 0 | 0.06 (0.03) (*2) |
| Pyridyl group content (wt. %) (*1) | 10.8 | 11.0 |

(*1): Determined from the amount of nitrogen measured by the Kjeldahl method.
(*2): The parenthesized figure is the pydiryl group content (milliequivalents/g of copolymer) on the surface of the latex particles.

EXAMPLE 2

A polyester tire cord and a natural rubber compound were bonded by using each of the latices A and B.

Resorcinol (16.6 parts), 146 parts of formalin (37%) and 1.3 parts of sodium hydroxide were dissolved in 333.5 parts of water, and with stirring, reacted at 25° C. for 2 hours. Then, 100 parts of latex A or B was added to the reaction mixture, and reacted at 25° C. for 29 hours with stirring. Then, 30 parts of Vulcabond E (a product of ICI Vulnax Company) was added. The solids concentration of the resulting aqueous solution was adjusted to 20%. The polyester tire cord (1500 D/2) was dipped in the aqueous solution by means of a single cord dipping machine for testing. After dipping, the tire cord was heat-treated at 240° C. for 1 minute. The treated polyester tire cord was held by a natural rubber compound prepared in accordance with the compounding recipe indicated in Table 2, and the rubber compound was press-cured. The adhesion strength between the tire cord and rubber was evaluated by a T adhesion strength testing method (at a temperature of 20° C. and a relative humidity of 65%). The results are shown in Table 3.

TABLE 2

| Rubber compounding recipe | |
|---|---|
| Natural rubber | 100 parts |
| Zinc oxide | 5 |
| Stearic acid | 2 |
| Sulfur | 2.5 |
| FEF carbon black | 45 |
| Process oil | 5 |
| N-hydroxydiethylene-2-benzothiazyl sulfenamide | 1 |
| 2,2,4-Trimethyl-1,2-dihydroquinoline polymer | 0.2 |

TABLE 3

| Latex | Adhesion strength (kg/cm) | |
|---|---|---|
| | After ordinary cure [vulcanization conditions 1 (*3)] | After over-cure [vulcanization conditions 2 (*4)] |
| Comparison | | |
| 1 (*1) | 16.0 | 10.1 |
| 2 (*2) | 15.8 | 10.1 |
| A | 15.8 | 10.2 |
| Invention | | |
| B | 16.1 | 14.2 |

(*1): Nipol 2518FS (vinylpyridine copolymer latex made by Nippon Zeon Co., Ltd.)
(*2): Commercial vinylpyridine copolymer latex
(*3): 150° C., 30 minutes
(*4): 170° C., 90 minutes

EXAMPLE 3

Latices C to G were produced under the same conditions as in Example 1 except that the monomers indicated in Table 4 were used in the first and second steps instead of the monomers used in Example 1. The properties of the latices are shown in Table 4.

EXAMPLE 4

Adhesives were prepared in accordance with the same recipe as in Example 2 using the latices C to G, and the same adhesion test as in Example 2 was carried out. The results are shown in Table 5.

TABLE 4

| Latex | Invention | | | | |
|---|---|---|---|---|---|
| | C | D | E | F | G |
| Monomer I | | | | | |
| Butadiene | 2.8 | 9 | 40 | 25 | 25 |
| Styrene | | 0.8 | 17 | 11 | 1 |
| Methacrylic acid | 0.1 | 0.2 | 4 | 4 | 4 |
| Total amount (parts) | 3 | 10 | 61 | 40 | 30 |
| Polymerization conversion (%) | 94 | 99 | 95 | 90 | 90 |
| Monomer II | | | | | |
| Butadiene | 67 | 61 | 24 | 45 | 45 |
| Styrene | 15 | 14 | | | 10 |
| Vinylpyridine | 15 | 15 | 15 | 15 | 15 |
| Total amount (parts) | 97 | 90 | 39 | 60 | 70 |
| Average particle diameter of the latex (Å) | 3440 | 2190 | 1170 | 1300 | 1310 |
| Carboxyl group content on the surface of the latex particles (milliequivalents/g of copolymer) | 0.015 | 0.015 | 0.30 | 0.30 | 0.30 |
| Pyridyl group content (wt. %) | 11.1 | 11.0 | 10.9 | 11.0 | 11.2 |

TABLE 5

| Latex (invention) | Adhesion strength (kg/cm) | |
|---|---|---|
| | After ordinary cure [vulcanization conditions 1 (*1)] | After over-cure [vulcanization conditions 2 (*2)] |
| C | 16.2 | 12.5 |
| D | 16.1 | 12.8 |
| E | 16.2 | 14.3 |
| F | 16.0 | 14.2 |
| G | 16.2 | 14.3 |

(*1) and (*2): Same as the footnotes (*3) and (*4) to Table 3.

EXAMPLE 5

Latices H to T were produced in the same way as in Example 1 except that the monomers indicated in Table 6 were used instead of the monomers used in Example 1. The properties of the latices are shown in Table 1. Using these latices, the same adhesion test as in Example 2 was carried out. The results are shown in Table 7.

TABLE 6

| Latex | H | I | J | K | L | M | N |
|---|---|---|---|---|---|---|---|
| Monomer I | | | | | | | |
| Butadiene | 30 | 30 | 30 | 30 | 30 | 30 | 30 |
| Styrene | 9 | 9 | 9 | 9 | 9.15 | 9.25 | 2.25 |
| Vinylpyridine | — | — | — | — | — | — | 6.75 |
| Methacrylic acid | — | — | — | — | 0.85 | 0.75 | 1 |
| Acrylic acid | 1 | — | — | — | — | — | — |
| Mono-octyl maleate | — | 1 | — | — | — | — | — |
| Itaconic acid | — | — | 1 | — | — | — | — |
| Monobutyl maleate | — | — | — | 1 | — | — | — |
| Total amount (parts) | 40 | 40 | 40 | 40 | 40 | 40 | 40 |
| Polymerization conversion (%) | 95 | 95 | 95 | 95 | 95 | 95 | 95 |
| Monomer II | | | | | | | |
| Butadiene | 40 | 40 | 40 | 40 | 40 | 40 | 40 |
| Styrene | 5 | 5 | 5 | 5 | 4.85 | 4.75 | 11.75 |
| Vinylpyridine | 15 | 15 | 15 | 15 | 15 | 15 | 8.25 |
| Methacrylic acid | — | — | — | — | 0.15 | 0.25 | — |
| Total amount (parts) | 60 | 60 | 60 | 60 | 60 | 60 | 60 |
| Average particle diameter of the latex (Å) | 1300 | 1320 | 1320 | 1310 | 1320 | 1300 | 1300 |
| Carboxyl group content on the surface of the latex particles (milliequivalents/g of copolymer) | 0.07 | 0.06 | 0.07 | 0.06 | 0.05 | 0.04 | 0.06 |
| Pyridyl group content (wt. %)(*1) | 11.1 | 11.1 | 11.0 | 11.0 | 11.2 | 11.1 | 6.0 |

| Latex | O* | P | Q | R | S | T | U* |
|---|---|---|---|---|---|---|---|
| Monomer I | | | | | | | |
| Butadiene | 30 | 30 | 30 | 30 | 39 | 39 | 39 |
| Styrene | 9 | 9 | 9 | — | — | — | — |
| Vinylpyridine | — | — | — | — | — | — | — |
| Methacrylic acid | 1 | 1 | 1 | 1 | 1 | 1 | 1 |
| Acrylic acid | 1 | — | — | — | — | — | — |
| Mono-octyl maleate | — | — | — | — | — | — | — |
| Itaconic acid | — | — | — | — | — | — | — |

TABLE 6-continued

| | | | | | | | |
|---|---|---|---|---|---|---|---|
| Monobutyl maleate | — | — | — | — | — | — | — |
| Total amount (parts) | 40 | 40 | 40 | 40 | 40 | 40 | 40 |
| Polymerization conversion (%) | 95 | 95 | 95 | 95 | 95 | 95 | 95 |
| Monomer II | | | | | | | |
| Butadiene | 40 | 40 | 40 | 30 | 20 | 16 | 14 |
| Styrene | 12 | 10 | — | — | — | — | — |
| Vinylpyridine | 8 | 10 | 20 | 30 | 40 | 44 | 46 |
| Methacrylic acid | — | — | — | — | — | — | — |
| Total amount (parts) | 60 | 60 | 60 | 60 | 60 | 60 | 60 |
| Average particle diameter of the latex (Å) | 1310 | 1310 | 1300 | 1320 | 1310 | 1310 | 1300 |
| Carboxyl group content on the surface of the latex particles (milliequivalents/g of copolymer) | 0.06 | 0.06 | 0.06 | 0.06 | 0.06 | 0.06 | 0.06 |
| Pyridyl group content (wt. %)(*1) | 6.0 | 7.3 | 14.6 | 22.2 | 29.0 | 32.1 | 33.6 |

Note:
The asterisks show comparisons.
(*1) is the same as the footnote (*1) to Table 1.

TABLE 7

| | Adhesion strength (kg/cm) | |
|---|---|---|
| Latex | After ordinary cure [vulcanization conditions 1 (*1)] | After over-cure [vulcanization conditions 2 (*2)] |
| Comparison | | |
| O | 13.1 | 7.4 |
| U | 13.7 | 9.9 |
| Invention | | |
| H | 16.0 | 14.3 |
| I | 16.1 | 14.0 |
| J | 16.1 | 14.2 |
| K | 16.1 | 14.0 |
| L | 16.0 | 13.1 |
| M | 15.2 | 12.1 |
| N | 15.1 | 12.1 |
| P | 15.1 | 12.0 |
| Q | 16.1 | 14.2 |
| R | 16.1 | 14.3 |
| S | 16.1 | 14.2 |
| T | 15.2 | 12.4 |

(*1) and (*2) are the same as the footnotes (*3) and (*4) in Table 3.

What is claimed is:

1. An adhesive composition for bonding fibers to rubber consisting essentially of (1) a copolymer latex obtained by emulsion polymerization of 45 to 85% by weight of a conjugated diene monomer, 0.1 to 25% by weight of an ethylenically unsaturated acid monomer, 10–45% by weight of a vinylpyridine monomer and 0 to 30% by weight of another monomer copolymerizable with these monomers, the amount of the carboxyl groups on the surface of the latex particles being at least 0.01 milliequivalent per gram of the copolymer, and (2) a resorcinolformaldehyde resin.

* * * * *